(12) United States Patent  (10) Patent No.: US 7,679,774 B2
Petz  (45) Date of Patent: Mar. 16, 2010

(54) METHOD, SYSTEM AND COMPUTER PROGRAM FOR THE GENERATION OF AN ELECTRONIC DOCUMENT FROM SCANNED IMAGE DATA

(75) Inventor: Petra Petz, Poing (DE)

(73) Assignee: Oce Printing Systems GmbH, Poing (DE)

( * ) Notice: Subject to any disclaimer, the term of this patent is extended or adjusted under 35 U.S.C. 154(b) by 919 days.

(21) Appl. No.: 10/473,927

(22) PCT Filed: Apr. 4, 2002

(86) PCT No.: PCT/EP02/03754

§ 371 (c)(1),
(2), (4) Date: Apr. 12, 2004

(87) PCT Pub. No.: WO02/082362

PCT Pub. Date: Oct. 17, 2002

(65) Prior Publication Data

US 2004/0187081 A1  Sep. 23, 2004

(30) Foreign Application Priority Data

Apr. 6, 2001 (DE) ............................... 101 17 349

(51) Int. Cl.
*G06K 15/00* (2006.01)
*G06F 3/048* (2006.01)
(52) U.S. Cl. .................... 358/1.18; 358/1.15; 358/1.16; 358/527; 358/531; 715/763; 715/764; 715/769; 715/838
(58) Field of Classification Search ................ 715/763, 715/764, 769, 838
See application file for complete search history.

(56) References Cited

U.S. PATENT DOCUMENTS 4,826,333 A  5/1989  Tanaka (Continued)

FOREIGN PATENT DOCUMENTS

DE  198 52 296  6/1999

(Continued)

OTHER PUBLICATIONS

The World of Printers—ISBN 3-00-001081-5 The Technologies of the High Performance Printers of Oce Printing Systems GmbH Nov. 2000,Edition 5.

(Continued)

*Primary Examiner*—King Y Poon
*Assistant Examiner*—Richard Z Zhu
(74) *Attorney, Agent, or Firm*—Schiff Hardin LLP

(57) ABSTRACT

In a method and system for display screen-aided generation of an electronic document from rasterized image data in an application computer, the image data are filed in at least one electronic storage. A first group of rasterized image data are provided stored page-by-page and a second group of rasterized overlay image data are provided in a relationship associated such that one page is associated with at least one overlay or one overlay is associated with at least one page. In a first display screen region, symbols of the first group are displayed per page in an ordered structure. In a second display screen region, image data of the first group are displayed. The document is generated an editor computer program loaded on the application computer from the rasterized image data and the rasterized overlay image data.

20 Claims, 10 Drawing Sheets

U.S. PATENT DOCUMENTS

| | | | |
|---|---|---|---|
| 4,944,614 A | | 7/1990 | Tanaka |
| 5,104,245 A | | 4/1992 | Oguri et al. |
| 5,140,676 A | * | 8/1992 | Langelaan ................. 715/515 |
| 5,577,188 A | * | 11/1996 | Zhu ........................... 715/745 |
| 5,579,087 A | * | 11/1996 | Salgado ......................... 399/1 |
| 5,615,015 A | * | 3/1997 | Krist et al. .................. 358/296 |
| 5,666,503 A | | 9/1997 | Campanelli et al. |
| 5,715,382 A | | 2/1998 | Herregods et al. |
| 5,718,520 A | | 2/1998 | MacKay |
| 5,751,924 A | * | 5/1998 | Hamada et al. ............ 358/1.16 |
| 5,760,775 A | * | 6/1998 | Sklut et al. .................. 715/839 |
| 5,995,721 A | * | 11/1999 | Rourke et al. .............. 358/1.15 |
| 6,009,442 A | * | 12/1999 | Chen et al. .................. 715/522 |
| 6,023,715 A | * | 2/2000 | Burkes et al. ............... 715/514 |
| 6,160,553 A | * | 12/2000 | Robertson et al. ........... 715/767 |
| 6,173,295 B1 | | 1/2001 | Goertz et al. |
| 6,259,445 B1 | * | 7/2001 | Hennum et al. ............. 715/709 |
| 6,307,573 B1 | * | 10/2001 | Barros ........................ 715/764 |
| 6,356,908 B1 | * | 3/2002 | Brown et al. .................. 707/10 |
| 6,611,347 B1 | * | 8/2003 | Okada et al. ............... 358/1.15 |
| 6,993,726 B2 | * | 1/2006 | Rosenholtz et al. ......... 715/835 |
| 6,996,782 B2 | * | 2/2006 | Parker et al. ................. 715/764 |
| 7,010,751 B2 | * | 3/2006 | Shneiderman .............. 715/232 |

FOREIGN PATENT DOCUMENTS

| | | |
|---|---|---|
| DE | 199 21 120 | 11/2000 |
| EP | 0 622 725 | 11/1994 |
| EP | 0 849 701 | 6/1998 |
| EP | 0 915 427 | 5/1999 |
| EP | 0 943 982 | 9/1999 |
| JP | 07182321 | 7/1995 |
| WO | WO 00/68877 | 11/2000 |

OTHER PUBLICATIONS

Chapter 16: Automating Tasks—XP-002426353 1998.

The Contribution of Thumbnail Image, Mouse-over Text and Spatial Location Memory to Web Page Retrieval in 3D—Czerwinski et al—1999.

Issues of Page Representation and Organisation in Web Brower's Revisitation Tools—Cockburn et al—2000.

Professional raster editor, scan program, file format converter . . . PixEdit.com 2000.

\* cited by examiner

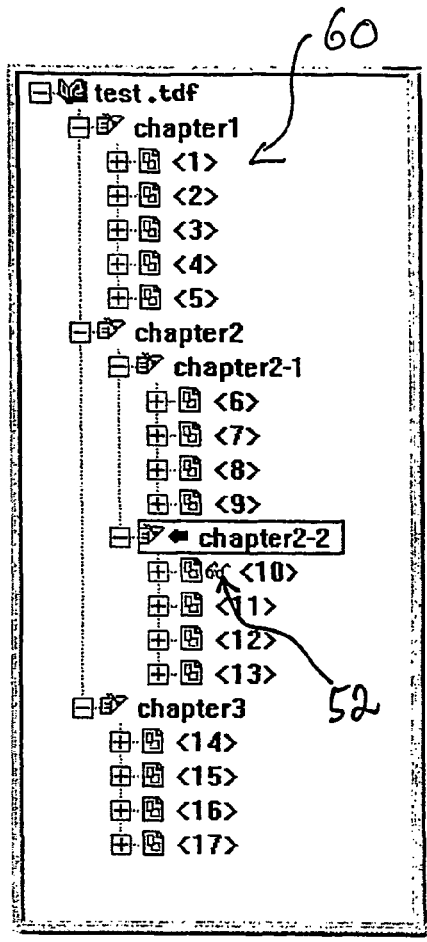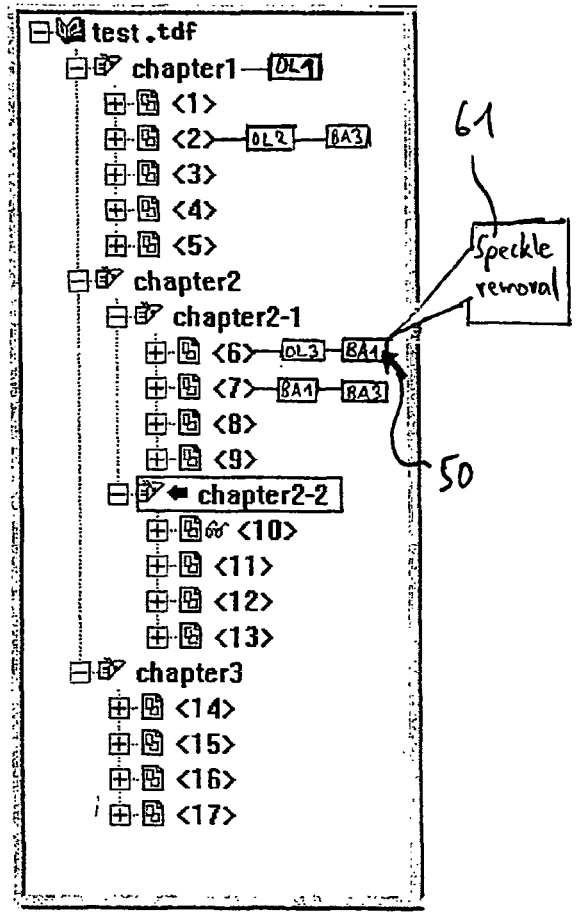
Fig. 6a					Fig. 6b
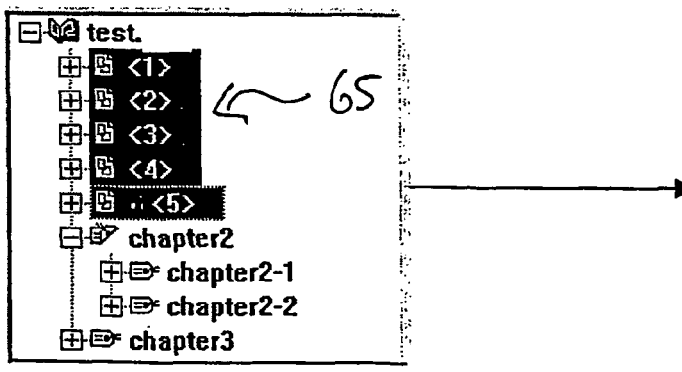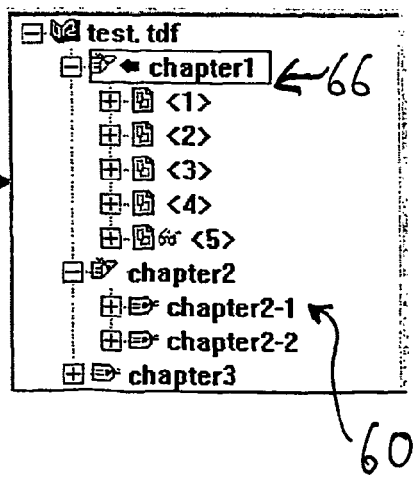
Fig. 7

| List of menu entries: |
|---|
| New |
| Open... |
| Import... |
| Cut |
| Paste |
| Copy |
| Delete |
| Add chapter |
| Remove chapter |
| Print |
| Page numbers |
| Print... |
| Production Print... |
| Corrections... |
| Filter... |
| Stretch and Rotate... |
| Figure... |
| Page... |

67 — Page numbers
68 — Production Print...

Fig. 8

METHOD, SYSTEM AND COMPUTER PROGRAM FOR THE GENERATION OF AN ELECTRONIC DOCUMENT FROM SCANNED IMAGE DATA

BACKGROUND OF THE INVENTION

The invention concerns a method, a print system, a computer system and a computer program to generate an electronic document from scanned image data.

In particular, the method and system relates to a system in which electronic documents are assembled page by page from scanned image data. The image data can, for example, be generated in that samples are sampled (scanned) and the image data thereby generated are filed page by page and pixel by pixel in an electronic storage. However, the data can just as well be generated completely electronically, i.e. be generated and/or scanned on an electronic device such as, for example, computer.

A method and a system to process structured images in electronically stored documents is known from U.S. Pat. No. 5,666,503.

Raster scan editor programs are known for processing of documents that exist as pages in scanned image formats. Such a program is, for example, available from the form Techsoft AS, Sandefjord, Norway under the trade name Pixedit®).

In the publication "The World of Printer", Dr. Gerd Goldmann (Hsg.). 5th edition (June 2000), Océ Printing Systems GmbH (Poing), ISBN 3-00-001081-5, what is known as a PRISMApro Server System is specified in chapter 11, that serves to generate electronic documents and to prepare the documents for a high-speed digital printing systems. A method and a system to impose print data is specified in WO 00.68877 A1 that is suitable for preparation of print data for such a high-speed print system.

A print device to print overlay formats is known from U.S. Pat. No. 4,944,614. Repetitive fixed image data and variable image data are stored in a storage. Furthermore, the print device comprises a format storage in which image data are stored corresponding to a formula for each document page. The image data of the format storage, the fixed image data as well as the variable image data, are combined with one another for printing.

The documents WO 00/68877 by the same applicant as well as JP 07182321 A and U.S. Pat. No. 5,715,382 are referred to as further prior art.

SUMMARY OF THE INVENTION

It is an object of the present invention to achieve a secure and fast processing of scanned image data given the compilation of an electronic document.

According to the method and system of the invention, for display screen-aided generation of an electronic document from rasterized image data in an application computer, the rasterized image data are filed in at least one electronic storage. A first group of n rasterized image data stored page-by-page that comprises a plurality of pages and a second group of m rasterized overlay image data in a relationship of 1:n or m:1 are associated such that one page is associated with at least one overlay or one overlay is associated with at least one page, and wherein n and m are respective whole numbers. In a first display screen region, symbols of the first group are display per page in an ordered structure. In a second display screen region, image data of the first group are displayed. The document is generated by an editor computer program loaded on the application computer from the rasterized image data and the rasterized overlay image data.

BRIEF DESCRIPTION OF THE DRAWINGS

FIG. 6 shows various document tree structures;
FIG. 7 shows tree structures with markings;
FIG. 8 shows a selection menu.

DESCRIPTION OF THE PREFERRED EMBODIMENTS

Figure 1:
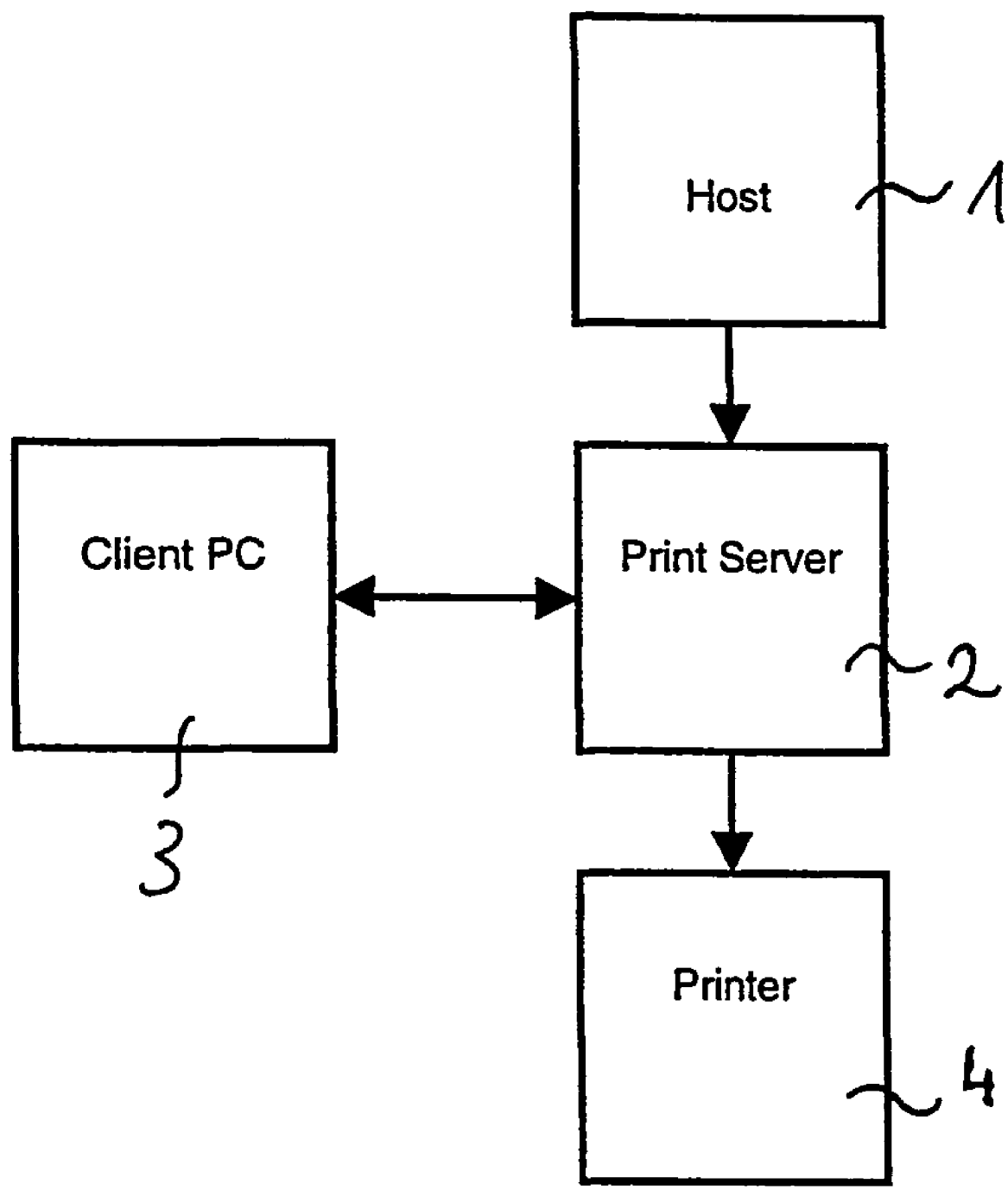
FIG. 1 shows a document generation system and printing system.

For a better understanding, reference is made in the following to the preferred embodiments shown in the drawings, which embodiments are described on the basis of specific terminology. However, it is pointed out that the scope of the invention is not to be restricted thereby since such variations and further modifications to the devices shown and/or to the method as well as such further applications of the invention as shown therein are considered as being common present or future knowledge of the relevant person skilled in the art.

According to a first aspect of a first group of image data that comprises a plurality of pages is associated with a second image data group, such that the first group is stored in the storage independent of the second group or is transferred to a storage. Both groups of image data are superimposed in a display or in a printing of an individual page of the document. This superimposition can in particular occur in a particular storage. The second group of image data can in particular be a plurality of what are known as overlays, that are respectively assembled such that they are to be positioned within a single page of the respective first group. The overlays thereby respectively comprise information that is positioned within a first page of the first image data, for example a text passage, an image, or a logo. The overlay data can furthermore in particular be associated with size information and/or position information that, in the superimposition, respectively establish the exact position and/or size of the overlay in the first image data or within the page.

According to an advantageous exemplary embodiment of the first aspect, the logical association of the image information between an overlay and the corresponding image data of the first group occurs according to the relationship 1:n and/or according to the relationship m:1, whereby n and m are respectively whole numbers greater than 2.

According to a further aspect that can be implemented in combination with or also independent of the first aspect, a first region is provided on a display device (for example a display screen) for processing the document, in which are shown in a tree-like structure the respective file names of the respective image data (what is known as a tree structure area). In a second area (what is known as a viewing area) of the display device, the corresponding image data can be displayed in detail. The respective display is effected via computer control. In the first, tree-like display structure, it is in particular provided to display additional information, at least given contact of the display file name with a selection unit such as a mouse pointer. As additional information, it can in particular be provided in a scaled-down special window (what is known as a thumbnail) to display the image data and/or to indicate information about associated overlay data and/or about associated special functions such as, for example, automated programs (batches or macros).

Furthermore, it can thereby in particular be provided to effect the display of the image data in the second display region (viewing region) only when the corresponding page is specifically selected in the tree structure region, for example by double-clicking with a mouse. The display in the viewing region occurs in particular with a high resolution, such that the image information is easily recognizable given observation with the human eye from an average viewing distance (approximately 25 cm).

According to a further aspect that in turn can be implemented independently of the previously cited aspects, the document processing system is connected with a document production control system. The connection occurs in particular such that overlay information that is stored in the document production system can be directly received by the print production control system, whereby overlay data must only be transmitted once to the print production control system, and the association of the overlay data with the respectively paged data of the document occurs via referencing that likewise must only be transmitted once. The transmission speed from the document generation system or processing system to the print production system or to the eventual print device implementing the print event is then possible with higher speed and the least data volume given complete information reproduction.

In a further preferred embodiment of the latter cited aspect print-specific data can be transferred with the start of a print job, such as for example page composition data that comprise the output via simplex-printing, duplex-printing or the like. Additionally, further print production data can also be transmitted that are relevant for generation of a document, for example specifications about the further processing of printed pages for stapling, binding, or the like.

In a further aspect that can in turn be implemented independently of the previously cited aspects, a plurality of pages or their image data are respectively combined into a range and, within the range of image data or of the range, form a subrange of image data. The respective ranges and subranges are then associated with main processing processes or subordinate processing processes that can be implemented at a specific command, such that the main processes only effect the ranges and the subordinate processes only effect the subranges. Such processing processes can, for example, be the automatic numbering of pages or the removal of image distortions.

Further aspects and embodiments are subsequently specified, from which additional advantages are made apparent.

FIG. 1 shows a printing system in which electronic documents are transmitted from a print data source 1 to a print server 2. The print data source 1 can, for example, be a host computer in which the documents exist in a print data language such as Postscript, Page Command Language (PCL), Advanced Function Presentation (AFP) or the like. The data thus transmitted are screened in the print server 2, i.e. are converted page by page into per-pixel data (bitmap data). Data formats such as Graphics Interchange Format (GIF), Taped Image File Format (TIFF), or other bitmap data can thereby be generated. In place of a host computer, the data source 1 can also be a scanner that scans the physically present documents, for example paper pages, and generates from them electronic data that are then transmitted as bitmap data to the print server 2.

An application computer 3 (personal computer, PC) at which the scanned, paginated document data stored in the print server 2 can be processed is connected with the print server 2.

The processed document data processed in this fashion are then edited in the print server 2 such that they are suitable for output to a printer 4. The connection between the individual devices 1, 2, 3 and 4 can thereby alternatively be either individual direct connections via data lines or also network connections via a Local Area Network (LAN) or a Wide Area Network (WAN) such as, for example, the Internet.

Figure 2:
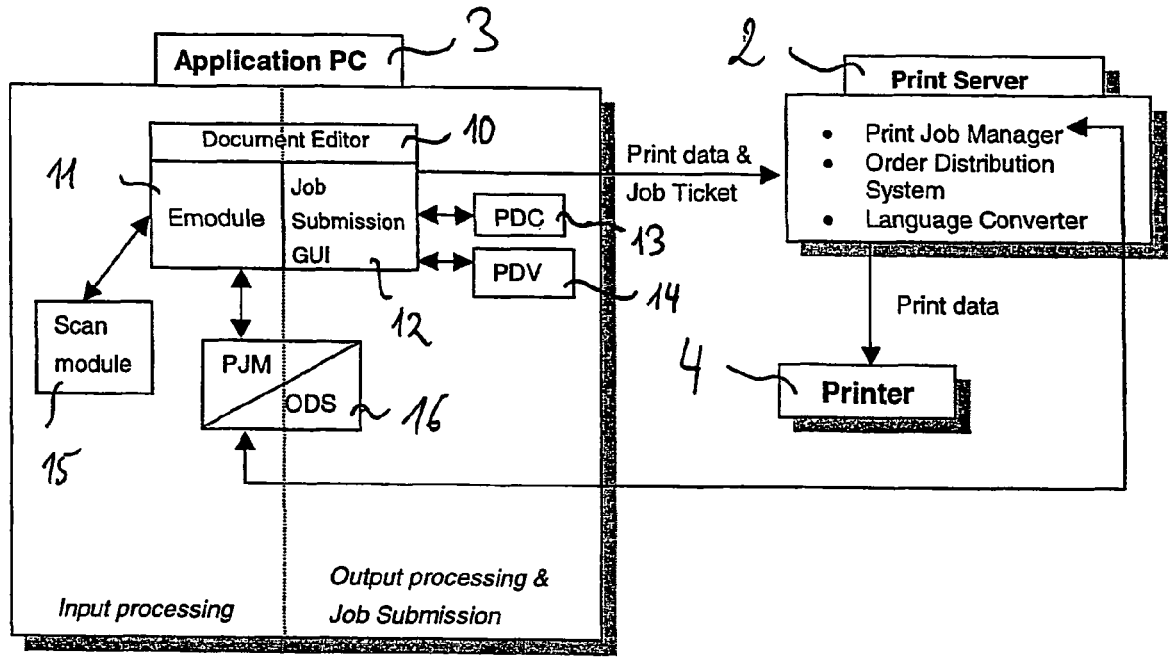
FIG. 2 shows first system components.

User PC 3, print server 2 and printer 4 are once again shown in FIG. 2, whereby various system modules, i.e. software programs installed on the respective devices, as well as their functional connections, are shown.

The central software module in the user PC 3 is a document editor 10 that, on the one hand, comprises an editing module 11 and, on the other hand, comprises a graphical user interface 12 with which processed documents can be transmitted to further processing modules, such as to an imposition module 13 (Professional Document Composer, PDC) or an external display program 14 (Professional Document Viewer, PDV).

A method and a system for imposition of print data that can run in a corresponding imposition module 13 is, for example, specified in WO 00/68877 A1. Also, in the previously cited book "The World of Printers" (ISBN 3-00-001081-5), on pages 11-15 through 11-18 under the title "PRISMA+PoD", further details of the Professional Document Composer 13 are specified. The content of both of these publications are hereby included by reference in the present specification.

The document editor 10 can also cooperate directly with a scan module 15, with which a scanner (scanning device) known to it can be operated or its data can be directly input into the document editor 10.

A print output module 16 additionally runs on the user PC, with which data from the document editor are edited such that they can be output in print-adapted fashion via the print server 2 to the printer 4 with higher speed. This print job manager module 16 (PJM) is connected with a job processing system (order distribution system, ODS). Both modules are also installed in the print server 2, such that a connection is enabled between user PC 3 and print server 2. Furthermore, a language converter is provided in print server 2 that converts the print data for output at the printer 4. On an arbitrary client console (Client PC 13) connected to a network, the print job manager 16 generates for each print job what is known as a job ticket and transmits the job ticket via the network to the order distribution system. It is possible by means of the PJM 16 to generate various resources (for example print data for reprints, job tickets, overlay marks, variable data sets) of an AFP data stream (advanced variable data stream) in the system, and to deposit them on the system. Moreover, the status of the job in the system can also be monitored.

Further details of the print job manager module 16 and of the order distribution system cooperating with it are specified later in connection with FIGS. 13 and 14. Further details of the print job manager module 16 are also specified in the previously cited publication "The World of Printers (ISBN 3-00-001081-5) in chapter 11 (in particular on the pages 11-11 through 11-15). This publication is hereby likewise included by reference in the present specification.

Figure 3:
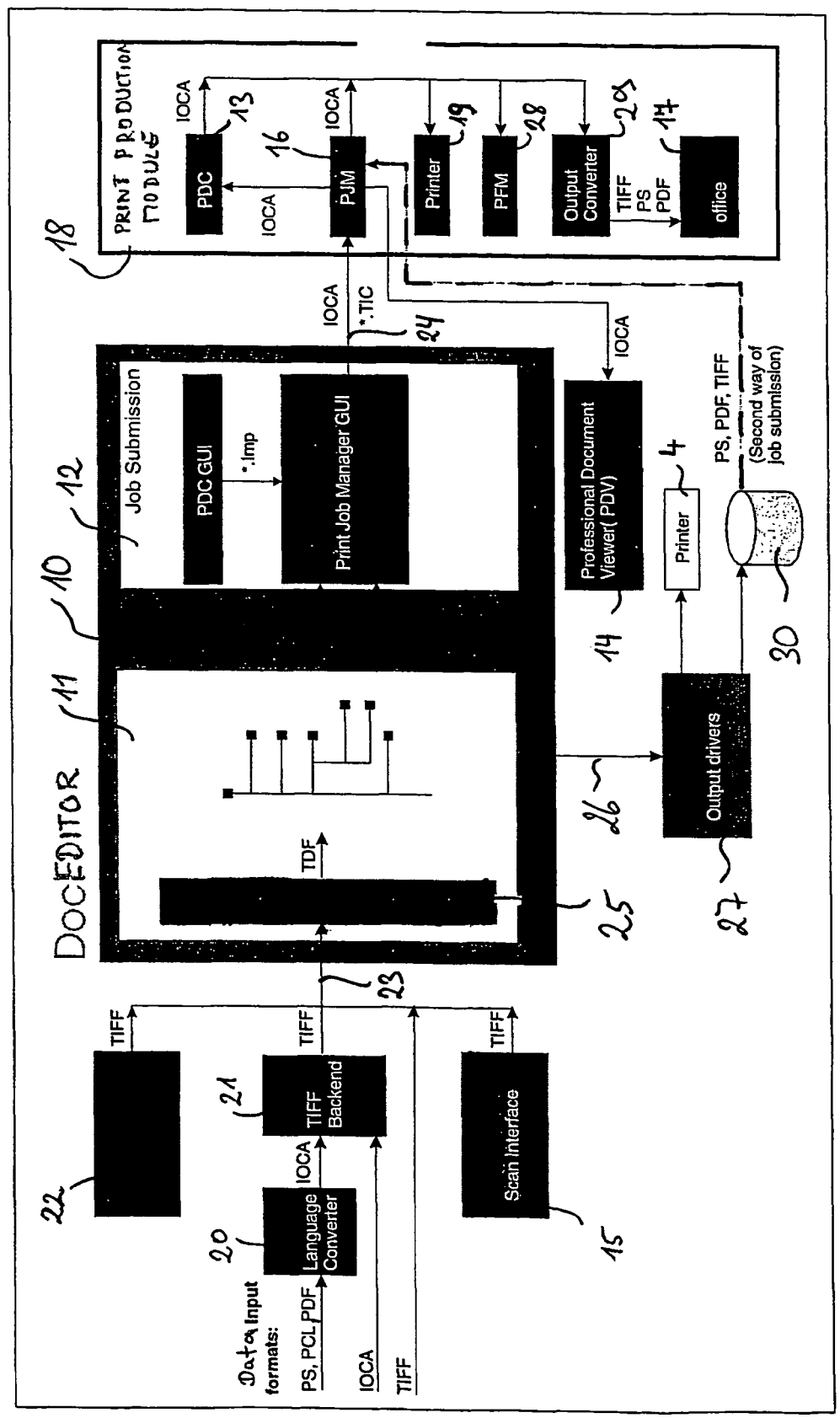
FIG. 3 shows second system components.

The system components are shown in somewhat more detail in FIG. 3, whereby the respective data formats that can be processed are also specified. On the input side, various modules are provided in which the respective input data are either directly or incrementally converted to the TIFF format. Via a first data input, standard print languages or standard print formats such as Postscript (PS), Printer Control Language (PCL) or Portable Document Format (PDF) are supplied to a language converter 20 that converts the data into the data format Image Object Content Architecture (IOCA). These data are then supplied to a TIFF data converter 21 that forms Tagged Image File Data (TIFF) from the IOCA data. Additionally, TIFF data can be directly input via a TIFF input module 22 or via the scanning module 15 already previously cited into the document editor 10.

The TIFF data input at the data input 23 are converted in a converter module 25 into an internal (temporary) data format (TDF) in the editor module 11. This module can, on the other hand, in turn generate IOCA data from the internal data format TDF, as well as parameters, that are transferred to the job submission module 12. To print out data from the document editor 10, the possibility exists either to transfer data via the output interface 26 to traditional printer drivers 27, or to transfer the IOCA data at the data output 24 to the print job manager module 16 of the print production module 18. Within the print production module 18, various modules are provided with which the document data are either preprocessed for output to a printer or for reproduction at another application program. Among these are the professional document composer 13 (with which an imposition scheme and other parameters necessary for imposition can be determined), the print job manager 16 (with which the job data are administrated), and a print file manager (PFM 28) (that administers the various files of the document). With an output converter 29, the data are finally converted such that they can be further processed by an interface 17 for a user program, or by an interface 19 for printers.

Based on the editor module 11, the possibility exists to direct processed document data out via two different output channels. On the one hand, it can occur via the output interface to the job submission module 12 specified above. On the other hand, it can occur via the output interface 26 to the output drivers 27. It can thereby be provided to provide an output driver for the starting of a printer 14, or an output driver to output the document data in a file (print to file) 30.

Figure 4:
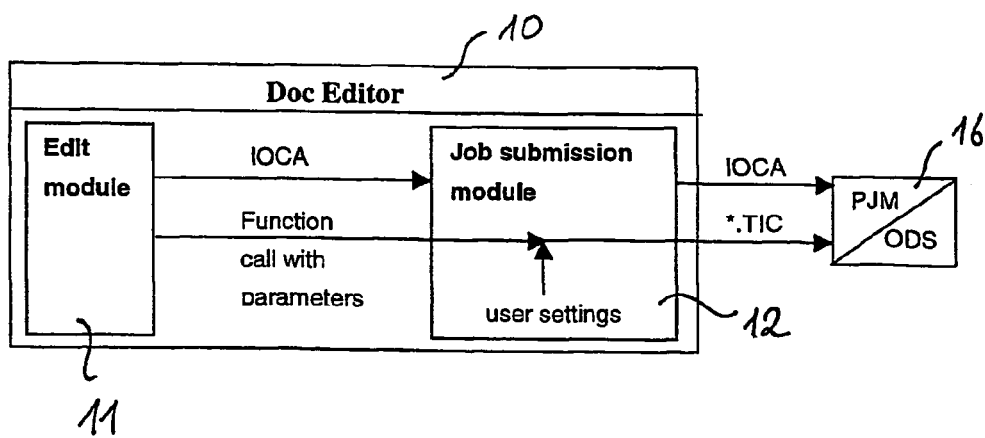
FIG. 4 shows third system components.

The process to generate a print job is shown in FIG. 4. Within the document editor 10, it is provided for this to start the job generation module 12 via a function call from the editing module 11. Via this function call, job parameters such as the job name and further details that are specified later, as well as IOCA data from the editing module 11, are transferred to the job generation module 12. Furthermore, within the job generation module 12 thereby called user-specific specifications are queried via an input window (see FIG. 14) before the job is transferred in the form of IOCA data or a special job file (Job Ticket File, *.TIC) to the print job manager or the order distribution system 16.

Figure 5:
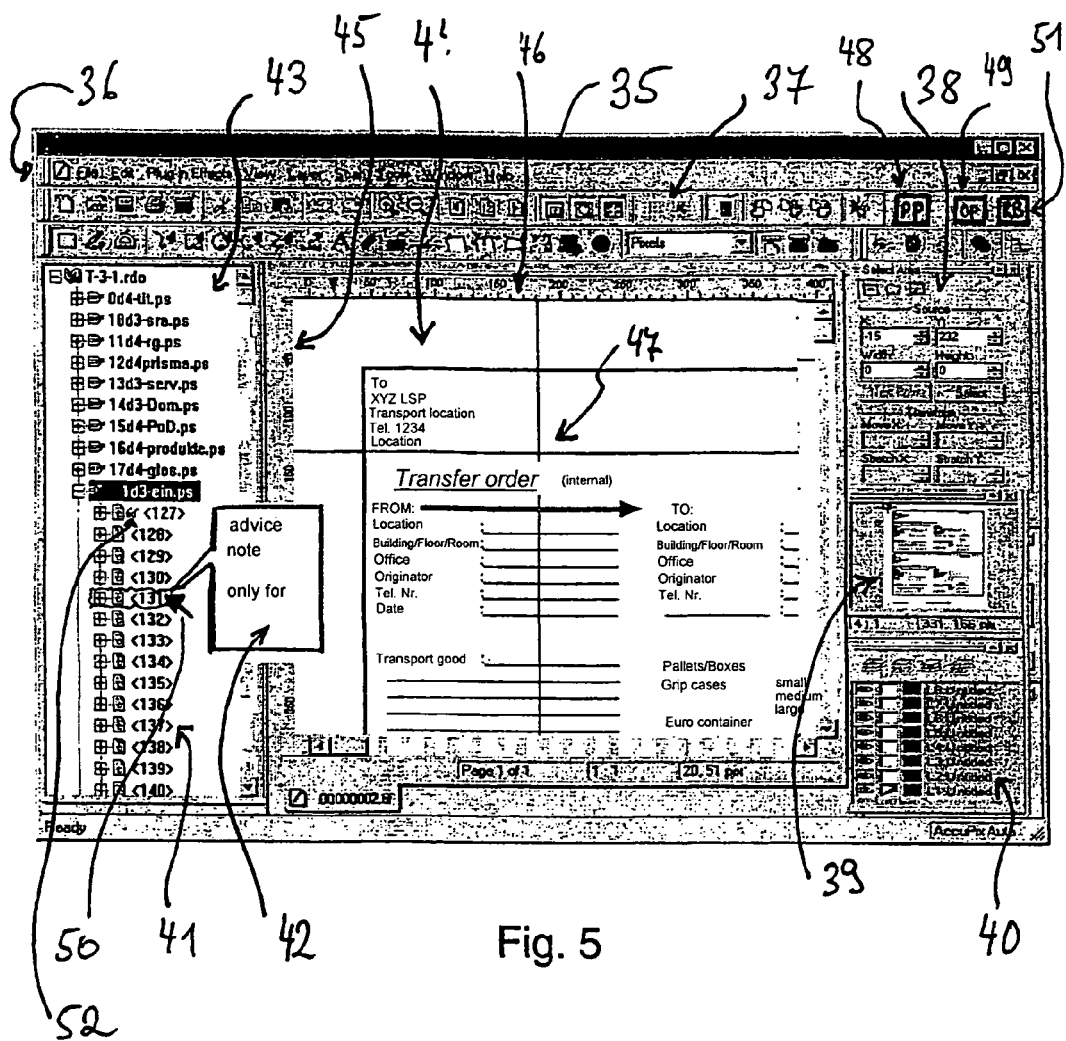
FIG. 5 illustrates a document processing menu.

FIG. 5 shows the basic processing window 35, which is brought by the editing module 11 to the graphical user interface (GUI) of the user PC 3, for example for display on a monitor.

The entire display menu is subdivided with push buttons into display surfaces and into function regions. In a first display region 43, all files stored on a fixed storage region (for example, within a defined directory on a hard drive) that should be merged into a document are displayed in a tree-like structure. For example, the files <127> <140> are respective individual pages of the document "1d3-ein.ps". The page <127> is thereby displayed in the display region 44 at a resolution of approximately 200 dpi, which is easily recognizable with the human eye. Depending on the resolution capability of the display device (screen), the display can be controlled up to the original resolution of the document of, for example, 300 or 600 dpi. The precise position of the information relative to presented, predetermined page borders can be recognized via rulers 45 and 46, whose reading is facilitated via a crosshair 47.

Various functions and sub-menus can be called with the main menu row, and with the pushbuttons 37 standard functions (tools) can be called per push of a button. In the region 38 (Tools Style Bar), special adjustments for stylized objects can be effected. In the overview window 39 is the activated page, here page <127> completely displayed and marked (which is visible currently in the detail display region 44). It is visible in the layer control region 40 whether the current displayed page has different, superimposed layers. Each of the layers is displayed in a freely selectable color, whereby the corresponding colors are also visible per push of a button in the detail display region 44 and in the overview window 39.

In order to facilitate the navigation within the entire document in the tree structure display region 41, a supplementary window 42 (what is known as a thumbnail) is dynamically opened for an individual page. Similar to the overview window 39 for the current completely displayed page, in the thumbnail 42 the respective page is shown raster scanned in scaled down depiction, for example at approximately only 50 dpi (with reference to the original size or, respectively, to the complete raster scan information of the original document). The thumbnail 42 appears automatically and dynamically as soon as the corresponding page number is contacted with the mouse pointer 50, in the example of FIG. 5 the page <131>. Depending on control execution, further information of the respective page in addition to the document content are shown in the thumbnail display 42, for example the page size, its disc space and/or the resolution of the pixels of the stored document in dots per inch (dpi). The thumbnail function is quite helpful in order to wander through the tree structure and to quickly locate specific pages.

Figure 11:
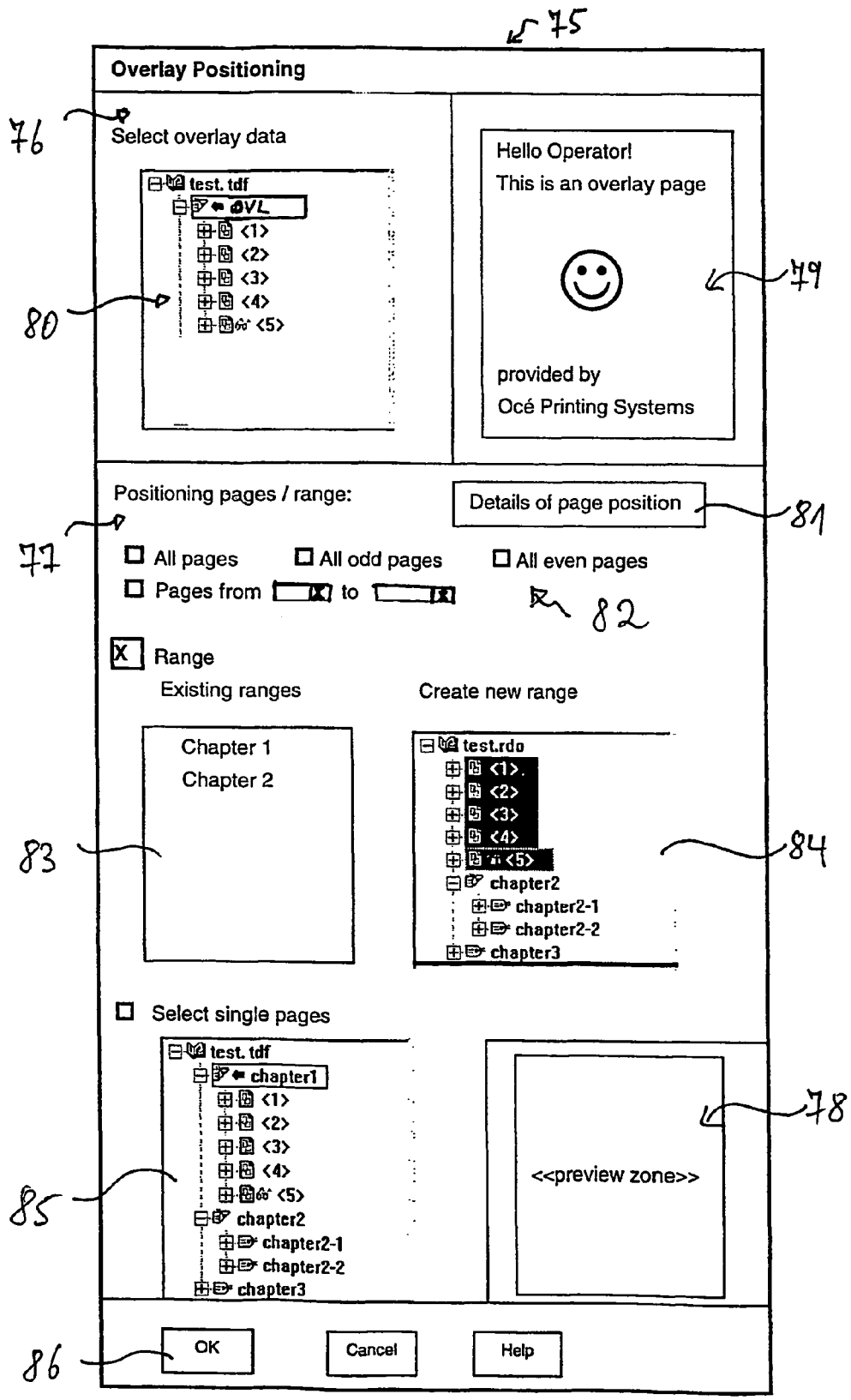
FIG. 11 shows a selection menu for association of overlays.
Figure 12:
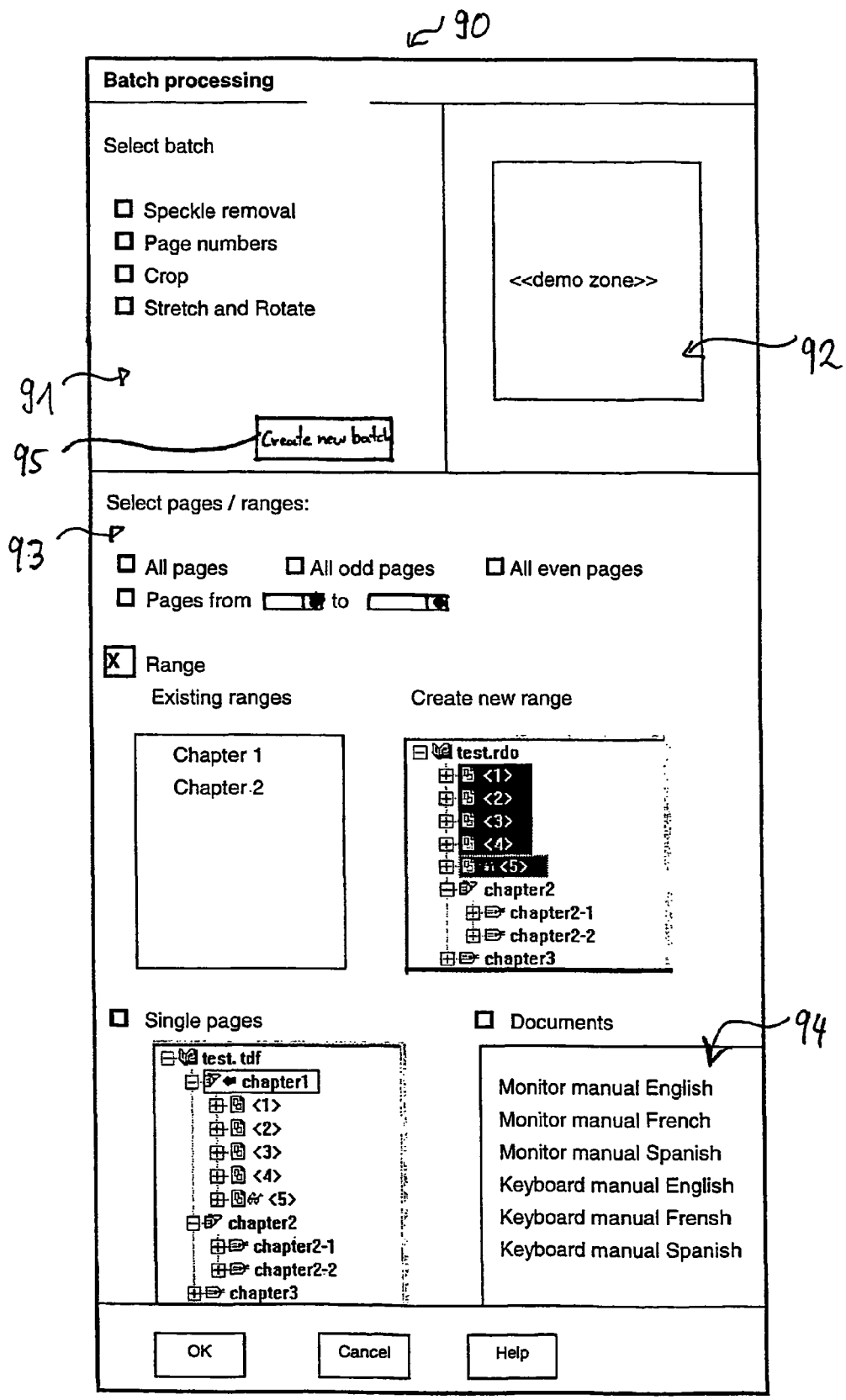
FIG. 12 shows a selection menu for association of automatic processes.

Starting from the main processing window 35, diverse sub-menu windows can be called (see FIGS. 8, 11, and 12).

Figures 13, 14:
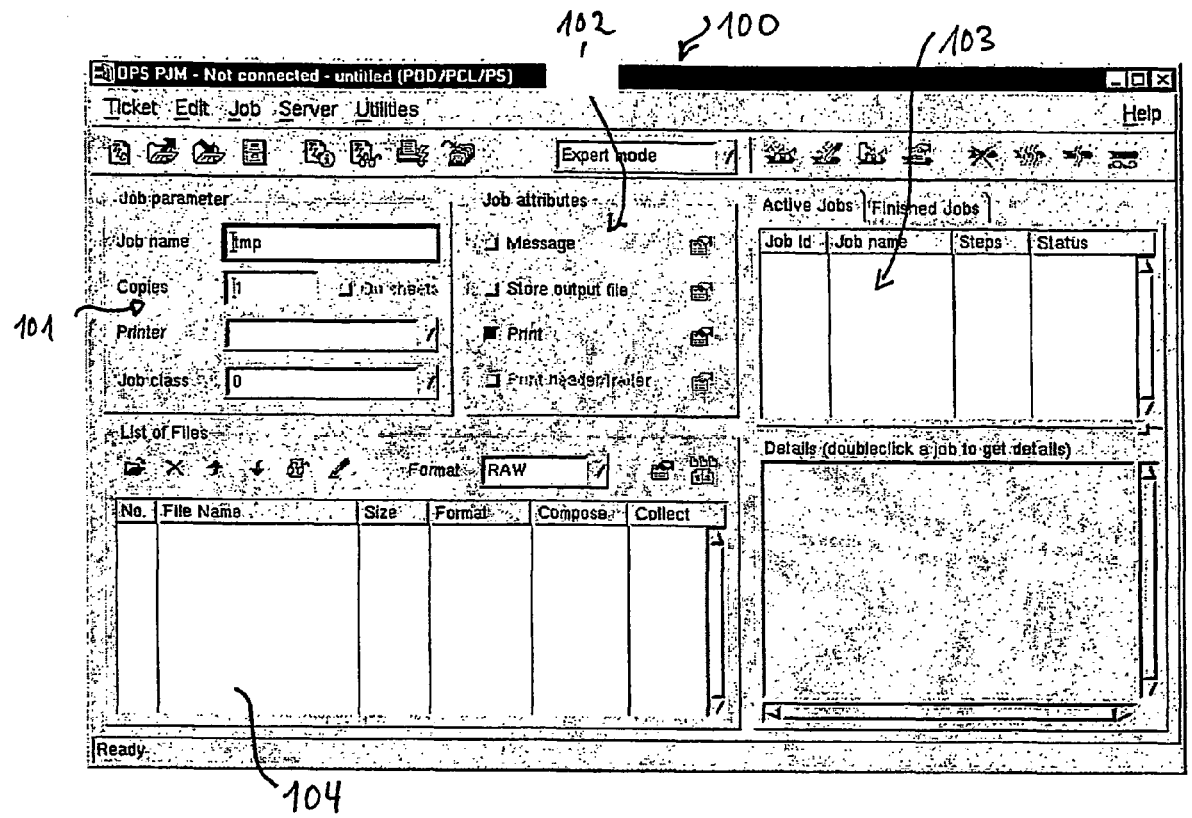
FIG. 13 illustrates a selection menu for a print monitoring system.
FIG. 14 shows a selection menu for print production parameters.

Within the toolbar pushbutton 37, the production print display of FIG. 14, via which the input of parameters occurs to control the print job manager or the order distribution system module 16, can be called with the pushbutton 48. The overlay positioning push button of the FIG. 11, via which the association between overlays and page data can be activated with the push button 49. The menu of FIG. 12, in which the regional processing of automatic functions for automatic processing of image data can be called via the push button 51 (Range Batch Processing). Which page is currently displayed within the detail display 44 is displayed in the tree-display region 41 with the identification symbol 52 (a glasses symbol).

FIG. 6a again shows a tree structure 16 which is displayed in the tree structure display region 41. Chapters (chapter 1, chapter 2) of a document and corresponding sub-chapters (chapter 2-1, chapter 2-2) are thereby respectively displayed in indented, structured form, and under them the respectively corresponding individual pages are listed. FIG. 6b shows a modified form in which, respective to a structured unit (a previously defined region), corresponding overlay information and/or automatic action information (batch information)

are displayed. It is recognizable in the example shown in 6b that all pages of chapter 1 are connected with the overlay "OL1" and, for example, additionally page <2> is connected/ superimposed with the overlay "OL2", as well as being processed by an automatic batch "BA3". Similar to the previously specified thumbnail display in the page region, a thumbnail display 61 is also dynamically provided for overlays or batches; they are displayed as soon as the corresponding overlay display or batch display is contacted with the mouse pointer 50. Either the respective overlay information or a function specification (for example speckle removal) of the corresponding batch is thereby displayed. By clicking the mouse on the symbol of an individual page within the tree structure 60, this page is displayed in the detail display region 44 and is thus accessible for further processing steps with regard to pixel manipulation and page processing. The corresponding page is indicated within the tree structure 60 by the identification symbol 52.

A corresponding display can also occurs for entire page ranges. Entire page ranges are thereby either marked with the mouse pointer 50 or via corresponding key functions on the keyboard (Shift-key and Control-key as well as corresponding arrow-movement keys). For such selected ranges, only respectively the first or the last page of the range is displayed in the detail display region 44. All of the functions (operations) assigned to the range are applied to all of the pages. When a page range is selected, such functions that can not be applied to an entire range (for example the pixel manipulation of an object, which is only available in an individual page) are then not offered for selection or are inaccessible.

Within a document or a region of the document, the logical sequence of the pages can be changed. Individual pages, page groups, or page ranges can be shifted to different positions within the document. The physical data are not thereby changed with regard to their order within the memory management for the stored image data, but rather merely the allocation of the respective start addresses in an allocation table associated with the document or range is separately stored.

It is shown in FIG. 7 how a new chapter can be generated from a group of marked pages, i.e. the marked area 65 becomes a new chapter 66. For this, the menu item "Edit" is called in the main menu 36, and function "add chapter" is called. An operation window thereby appears in which the chapter name can be input, such that the chapter designation also appears in the tree structure 60 as a name.

In FIG. 8, in addition to the menu item "add chapter", some other menu items are shown that are of importance for an efficient processing of such electronic documents. For example, it is enabled with the menu item 67 "page numbers" to automatically generate the page numbering. The connection to the print production module 16 (print job manager and order distribution system) is directly produced with the menu item 68 "Production Print". In a print production work process (print production work flow), it is of great importance to be able to largely automatically process page ranges. For example, the precise positioning of the print data on the page is an elaborate process that can be substantially accelerated in that specific page-referenced specifications are valid for the entire document (meaning for all pages or at least for a specific region of the document, for example for chapters). Such a regional association can already occur in the generation of the document, even though the individual document pages are respectively individually scanned. It is thereby in particular advantageous to enable the following associations:

individual pages, for example pages 1, 5, 9, whereby a specific association or automatic processing occurs on the pages 1, 5 and 9 page ranges, for example pages 1-10;

staggered association, for example pages 1-50: 2, meaning an operation or association effects every second page within the range between the pages 1-50. Such an operation is, for example, advantageous in order to respectively treat the front of a page and the back of a page differently; and/or combination of the associations cited above.

In the course of the region-by-region or also page-by-page automatic processing, diverse functions can be provided such as they are, for example, specified in FIGS. 11 and 12.

Figure 9:
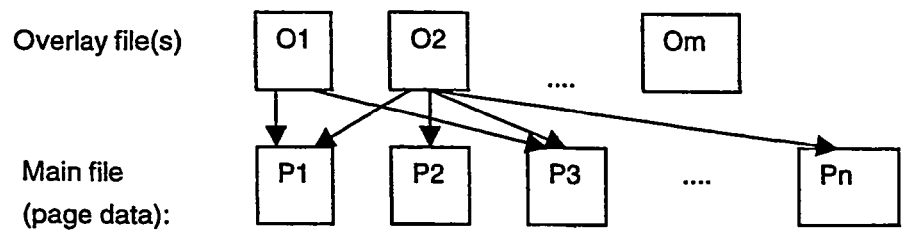
FIG. 9 illustrates an overlay structure.
Figure 10:
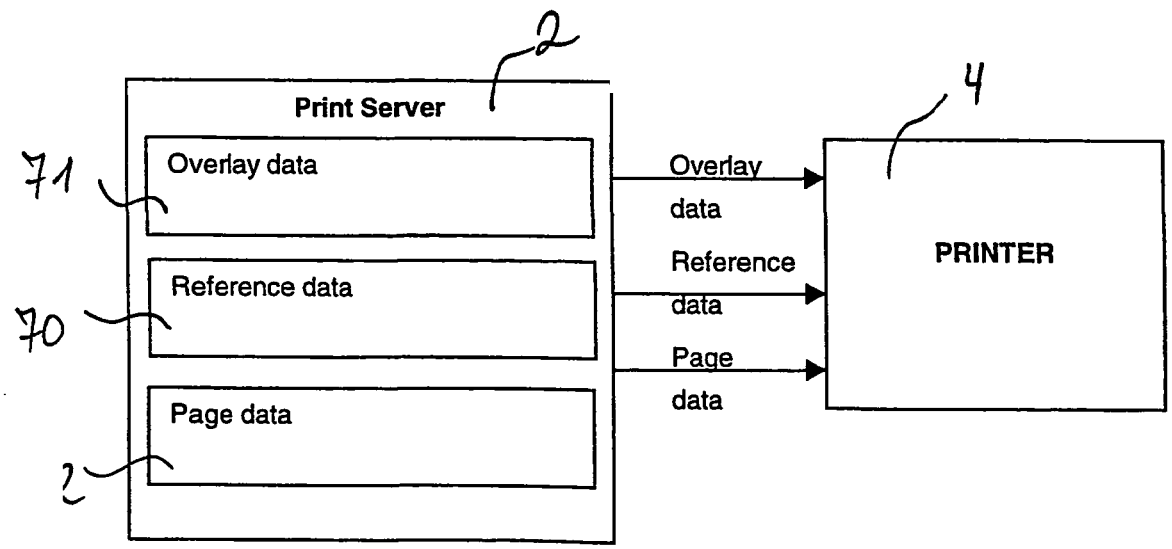
FIG. 10 illustrates the scheme of a data transmission.

It is now specified using the FIGS. 9 through 11 how image data of a first page or a first group of pages are connected with overlay data. FIG. 9 shows the logical principle in the association of overlay data with page data. The page data thereby comprise the pages P1, P2 . . . Pn and the overlay data O1, O2 . . . Om. A maximum of m overlays can thus be associated with each page, and a maximum of n pages can by associated with each overlay, whereby m,n are respectively positive whole numbers. The logical association of the pages (as is depicted in FIG. 10) within the print server 2 in a reference data storage 70, whereby in turn an association to corresponding ranges or individual pages can be made. The overlay data are separated from this in the storage 71, and the page data are filed in storage 72. It is possible via the corresponding association of reference data between the overlay data and the page data to substantially relieve the data transfer from the print server 2 to the printer 4, in that the page data, the reference data, and the overlay data are respectively transferred from the print server to the printer separated from one another. This enables each of these data sets to respectively be transferred only once, i.e. to transfer the data of an overlay respectively only once from the print server 2 to the printer 4. In contrast to conventional methods in which each page was transferred together with respectively all associated overlays, this significantly relieves the data transfer from the print server 2 to the printer 4, because overlay data and/or page data that occur repeatedly and identically in the document must only be superimposed once. This advantage is achieved above all when n or m are respectively whole numbers greater than 2.

An overlay can thereby comprise either an image element which is positioned in a page or also entire page information. Within the reference data 70, the corresponding data for each overlay are stored, for example its size, its name, its position within a page as well as the page range or the individual pages with which this overlay is associated. An overlay can thereby be associated with n pages, and a page can be associated with m overlays.

Both the layers O1 through On and the pages P1 through Pn can mutually be stored in a single IOCA file. However, the separate storage (shown in FIG. 10) in storage ranges 71, 72 in different IOCA files is advantageous.

Within the document editor 10 (compare FIGS. 2, 3 and 4), the storage already occurs in the editing module 11, whereby the corresponding data are then transferred from the editing module 11 to the job submission module 12 before they are transmitted to the print server 2 or, respectively, to printer 4.

In FIG. 4, a selection menu window and association window 75 are shown which can be called from the editor module 11 via the push button 49 (FIG. 5). The association window 75 comprises a first region 76 in which the overlay data can be selected. In a second region 77, the positioning of the respective overlay data within the respective pages and the association to the corresponding pages or ranges is displayed. In a zone 99, the currently selected overlay (here the overlay Nr. <5> displayed in the tree structure 80) is completely displayed. As soon as an overlay is selected, the detailed positioning of the overlay on the respective pages can be determined via the push button 81, for example the distance of the overlay from the respective page borders, its precise position and/or an enlargement or shrinking of the overlay information within the page.

Additionally, it is determined for each overlay with which pages it is associated. For this, all pages, all even or odd pages, or a specific page range by numbers can be specified via page selection window 82. Alternatively to this, an already existing range, for example entire chapters, can also be selected via the chapter selection region 83. A regeneration of ranges can also occur in a region 84, and the overlays are associated with this new range. Via the association, association data are obtained via which the later, speed-optimized, one-time transmission of the overlay data and the page data is possible, as well as their page-precise composition and repositioning within the print server.

Finally, individual pages can be associated via the individual selection region 85 with the respective overlay, whereby a first inspection of the overlay superimposition can occur in the superimposition display zone 78 for the respectively selected page.

The association is completed, and the corresponding association parameters stored, via the push button 86. These stored data are further processed in a later print job processing process by the print job manager 16, the other distribution system and/or the profession document composer 13, or the professional document viewer, such that the correct association between overlays and pages can ensue with the corresponding systems both page by page and within the page.

An association window 90 to associate predetermined automatic processing processes for individual pages, ranges or documents is shown in FIG. 12. This window can also be directly called by the processing window 35 via the push button 51. Within the window 90, the correspondingly automated processing events can first be called in the selection field 91, such as, for example, removal of image specks ("speckle removal"), the automatic numbering of pages, the automatic centering on the page (cropping), as well extending functions or rotation functions. The respective functions are graphically illustrated, or at least specified via clarifications, in the demonstration field 92.

Those pages, ranges or documents in which the respectively automated event (batch) should run are then selected in the selection region 93. As previously, adjustments can thereby be selected in the field 75 between page-by-page and region-by-region. Additionally, an association for complete documents, or also a plurality of documents, can also occur in the zone 94. The image processing event for whole documents is hereby accelerated. New automated actions can be formed or assembled from known actions via the push button 95. Moreover, it can thereby be provided to completely accept already assembled automatic actions (batches), inclusive of the range specifications associated with them, into a new batch to be generated.

A base window of the print job manager 16 is shown in FIG. 13 that is started via the function call 68 in FIG. 8. The substantial specifications for a print job (such as the job name, the number of the copies to be generated, the printer to be activated, and so forth) are specified in the region 101. Job attributes are specified in the field 102, and all active (i.e. jobs presently located in processing for printing) as well as all already edited jobs are listed in the field 103. The files belonging to a currently selected job are listed in the window 104.

A selection menu 110 is shown in FIG. 14 which likewise can be called from the menu item 68 (Production Print) of FIG. 8. Various parameters can thereby be adjusted that are part of the editing of a print job belonging to a complete document, such as the imposition of the professional document composer, the print mode (simplex, duplex, tumble) as well as the inclusion of special pages, such as cover pages and divider pages. Further specification for page setup (paper size, paper orientation, borders, etc.), as well as supplementary adjustment for post processing devices of the printer such as stapling devices, barcode labelers and so forth, can be adjusted. Information necessary for the print job manager, such as print job name, printer name, number of the copies, and so forth can also be specified via this adjustment menu.

An exemplary embodiment of the invention is specified. It is clear that the invention can at any time be combined with different functionalities. The invention can in particular be used in a print production environment and comprises devices such as a computer and a printer, but also control software (computer programs and their modules) or computer program products such as, for example, files and volatile as well as non-volatile data storage that, upon loading onto a computer, effect the sequences specified above.

Although the acceptance of the raster scanned page data and overlay data as well as the referencing data or indexing data by the document generation program was specified by an example of a print production system, this acceptance could also occur on another document management system, and thereby lead to a high transfer speed. For example, such an acceptance in the course of the transfer of the raster scanned data in a network (LAN, WAN) by an electronic system (server, e-mail program, document management program) to a corresponding or even identical second program can be very advantageous.

To recapitulate, it is established:

A method and is provided system to process image data scanned page by page to generate an electronic structured document. The processing function modules are functionally coupled with a print production system that comprises a plurality of sub-modules (print job manager, order distribution system), such that in the generation of the document and its forwarding to the print production system, a time-optimized work flow is achieved. A storage-optimized type of superimposition of image data occurs via logical association of overlay data with per-page data or data ranges. Furthermore, additional functions are provided, such as the dynamic display of information about individual document pages and/or of processing information for the respective document pages. A per-region processing of the data is also provided.

Although in the drawings and in the previous description preferred embodiments have been illustrated and described in every detail, this is to be considered as being merely exemplary and as not restricting the invention. It is pointed out that only the preferred embodiments have been illustrated and described and all variations and modifications which are within the scope of the invention at present or in the future are protected.

The invention claimed is:

1. A method for screen-aided generation of an electronic document from rasterized page image data in an application computer which creates print data for a printer, comprising the steps of:

filing the rasterized page image data in an at least one electronic storage;

in the application computer providing a first group of n page rasterized image data stored page-by-page and a second group of m overlay rasterized image data in a relationship of 1:n or m:1 associated such that one page of said first group is associated with at least one overlay of said second group or one overlay of said second group is associated with at least one page of aid first group, and wherein n and m are respective whole numbers greater than two;

in a first display screen region of a basic processing window of the application computer displaying symbols of the first group for each page in an ordered structure;

in a second display screen region simultaneously displaying in the same basic processing window but separate from the first region of the application computer displaying image data of at least one page of the first group selected in the first display screen region in detail;

in the first display screen region selecting with a selection device one of the symbols corresponding to one of the pages displayed in the first display screen region and displaying a supplemental thumb nail display window of less detail for that selected symbol, said selection being independent of and in addition to the selected page being shown in detail in the second display screen region;

for each displayed symbol representing a corresponding page, also in said first display screen region showing with an overlay symbol if an overlay is to be associated and combined with the page represented by the displayed symbol; and generating said electronic document as said print data by an editor computer program loaded on the application computer, said editor computer program combining said page rasterized image data with said overlay rasterized image data.

2. A method according to claim 1 wherein the group is stored in the storage independent of the second group.

3. A method according to claim 2 wherein the first group is transferred independent of the second group from a first device to a second device, and the second group is first superimposed with the first group for at least one of a display and for printing of each individual page.

4. A method according to claim 1 wherein an association occurs such that the image data of both groups are connected with one another via referencing data.

5. A method according to claim 4 wherein the overlay data and the referencing data are respectively transmitted only once to a print production control module to print the document.

6. A method according to claim 1 wherein a mutual storage of the overlay and the page image data occurs as a single IOCA document.

7. A method according to claim 4 wherein the association occurs such that position information is provided for superimposition of the overlay image data with the first group of the page image data.

8. A method according to claim 1 wherein:
one group of image data are selected for processing;
at least one attribute is associated with the group of image data;
an automatic processing process is at least one of selected and assembled from a plurality of selectable processes; and
the group of image data is processed with the selected process.

9. A method according to claim 8 wherein the attribute comprises at least one of said association with overlays and an association with automatic processing processes.

10. A method according to claim 8 wherein the associated overlay is displayed in the first display screen region and attributes of the image data are also displayed in the first display screen region.

11. A method according to claim 1 wherein a connection is produced from a document editing module affecting a method sequence to a print production control module.

12. A method according to claim 1 wherein print-specific data are stored.

13. A method according to claim 12 wherein job submission data are separately indicated and are first processed by at least one of a print system and a print production control module when a print event is first triggered at said printer.

14. A method according to claim 11 wherein the image data are supplied to said printer from said print production control module and are there printed out.

15. A method according to claim 1 wherein the image data are at least partially processed in a TIFF format.

16. A method according to claim 1 wherein the image data are selected by at least one of per page and per region for full display in said second display screen region.

17. A method according to claim 1 wherein a page sequence that is predetermined per image segment via logical attributes is associated with the image data within the document.

18. A method according to claim 17 wherein the sequence within at least one of the group and a subgroup are changed such that only a logical association is changed, but not a storage location in the storage.

19. A computer readable medium comprising a computer program for screen-aided generation of an electronic document from rasterized image data and which creates print data for a printer, said computer program performing the steps of:

filing the rasterized page image data in an electronic storage medium of a computer;

storing a first group of n page rasterized image data stored page-by-page in said storage and storing a second group of m overlay rasterized image data in a relationship of 1:n or m:1 associated such that one page of said first group is associated with at least one overlay of said second group or one overlay of said second group is associated with at least one page of said first group, and wherein n and m are respective whole numbers greater than two;

displaying in a first display screen region of a basic processing window symbols of the first group for each page in an ordered structure;

simultaneously displaying in a second display screen region of the same basic processing window but separate from the first region image data of at least one page of the first group selected in the first display screen region in detail;

in the first display screen region selecting with a selection device one of the symbols corresponding to one of the pages displayed in the first display screen region and displaying a supplemental thumb nail display window of less detail for that selected symbol, said selection being independent of and in addition to the selected page being shown in detail in the second display screen region;

for each displayed symbol representing a corresponding page, also in said first display screen region showing with an overlay symbol if an overlay is to be associated and combined with the page represented by the displayed symbol; and said computer program further comprising an editor computer program which generates said electronic document as said print data, said editor computer program combining said rasterized image data with said overlay rasterized image data.

20. A print system for screen-aided generation of an electronic document from rasterized image data, comprising:
- an application computer with a display, said application computer creating print data for a printer;
- an electronic storage associated with the computer;
- said rasterized page image data being filed in said electronic storage;
- said application computer having a computer program providing a first group of n page rasterized image data stored page-by-page and a second group of m overlay rasterized image data in a relationship of 1:n or m:1 associated such that one page of said first group is associated with at least one overlay of said second group or one overlay of said second group is associated with at least one page of said first group, and wherein n and m are respective whole numbers greater than two;
- said computer program causing in a first display screen region of a basic processing window of said display a display of symbols of the first group for each page in an ordered structure, and in a second display screen region simultaneously displaying in the same basic processing window but separate from the first region of the display causing a display of image data of at least one page of the first group selected in the first display screen region in detail;
- in the first display screen region selecting with a selection device one of the symbols corresponding to one of the pages displayed in the first display screen region and displaying a supplemental thumb nail display window of less detail for that selected symbol, said selection being independent of and in addition to the selected page being shown in detail in the second display screen region;
- for each displayed symbol representing a corresponding page, also in said first display screen region showing with an overlay symbol if an overlay is to be associated and combined with the page represented by the displayed symbol; and
- said application computer program further comprising an editor computer program which generates said electronic document as said print data by combining said page rasterized image data with said overlay rasterized image data.

* * * * *